(No Model.)
N. JOHNSON & H. L. HUNT.
BELT GUIDE.
No. 571,923. Patented Nov. 24, 1896.
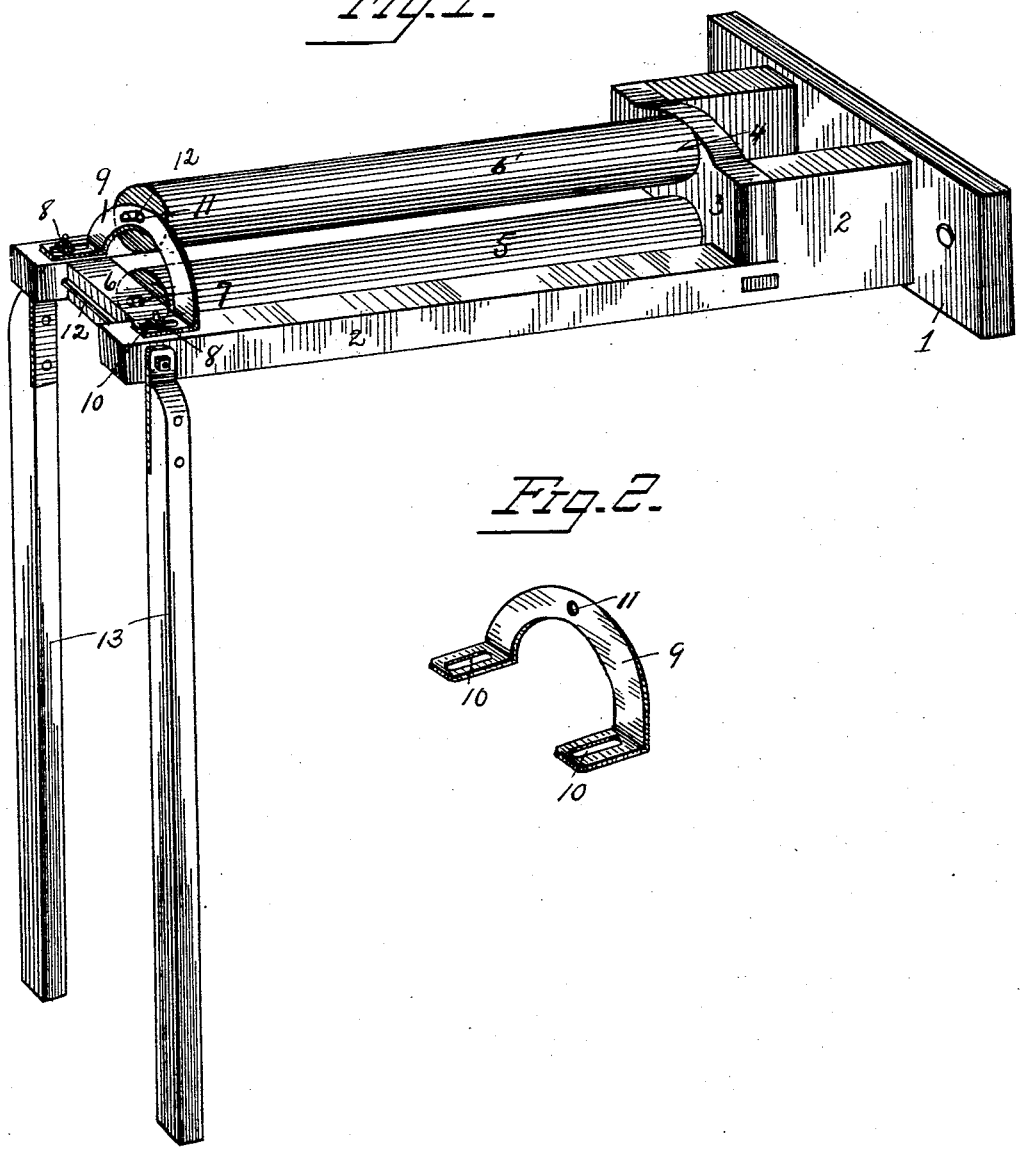
WITNESSES
Albert Popkins
G. M. Copenhaver.
INVENTORS
Neals Johnson
Henry L. Hunt
By Attorney
W. A. Ruff

UNITED STATES PATENT OFFICE.

NOAH JOHNSON AND HENRY L. HUNT, OF PADUA, ILLINOIS.

BELT-GUIDE.

SPECIFICATION forming part of Letters Patent No. 571,923, dated November 24, 1896.

Application filed June 20, 1895. Serial No. 553,629. (No model.)

*To all whom it may concern:*

Be it known that we, NOAH JOHNSON and HENRY L. HUNT, of Padua, in the county of McLean and State of Illinois, have invented certain new and useful Improvements in Belt-Guides; and we do hereby declare the following to be a full, clear, and exact description of the invention, such as will enable others skilled in the art to which it appertains to make and use the same.

Our invention relates to improvements in belt-guides principally designed for use in connecting portable engines with threshing-machines, corn-shellers, and other like apparatus or machines; and its object is to provide an improved construction of the same by which the belt is guided in its movement and prevented from running off the pulleys when they are not in proper alinement.

The invention consists in the novel construction and combination of parts hereinafter fully described and claimed.

In the accompanying drawings, Figure 1 is a perspective view of a belt-guide constructed in accordance with our invention. Fig. 2 is a similar view of the movable bearing-plate detached.

In the said drawings the reference-numeral 1 designates a plate adapted to be secured to a threshing-machine or other object, in which are mortised two outwardly-extending horizontal brackets 2, formed with extensions at the inner ends and to which is fastened a strut 4, in which are journaled the inner ends of two parallel rollers 5 and 6', one above the other. The outer ends of the brackets are connected by a strut 6, in which the lower roller is journaled. This strut is secured in place by screw-bolts 8, the upper ends of which project up beyond the upper sides of the brackets and pass through elongated slots in a movable bearing-plate 9, which is held in place by set-nuts. The outer end of the upper roller 6' is journaled to this plate, which is movable outwardly to allow the belt to be slipped between the rollers. Passing through the outer ends of the brackets is a transverse rod 12, to the ends of which are pivoted props 13, which serve to support the outer ends of the brackets.

The operation is as follows: The bracket-plate 1 is secured to any suitable or convenient object and the props 13 turned down so that their lower ends will rest on the ground, so as to support the outer ends of the brackets. The nuts on the bolts 8 are then loosened, so as to allow the bearing-plate 9 to be moved outward and the stud 12 of the roller 6' disengaged from the aperture 11 in said plate. The belt can now be slipped between the rollers, when the plate 9 is moved inward and the journal of the roller again engaged with the hole 11 and the nuts tightened. One run of the belt will now pass between the rollers, which will guide the same and hold it on the pulleys of the engine and the machine operated thereby, the other run passing above the brackets and traveling over the upper roller, so as to prevent it from contacting with the lower run if the belt should become loose and sag.

Having thus fully described our invention, what we claim is—

1. In a belt-guide the combination with the plate the brackets secured thereto, and the struts, of the lower roller journaled to said struts, the bearing-plate formed with elongated slots, the screw-bolts passing through said slots, the nuts, and the upper roller journaled to one of said struts and to said plate, substantially as described.

2. In a belt-guide, the combination with the plate, the brackets, the struts and the rollers, of the props pivoted to the outer ends of the brackets, substantially as described.

3. In a belt-guide, the combination with the plate, the brackets secured thereto, the struts secured to said brackets and the pivoted props for supporting the outer ends of the brackets, of the movable bearing-plate formed with elongated slots, the screw-bolts passing through said brackets and slots, the nuts engaging with said bolts, the lower roller journaled to said struts and the upper roller journaled to said bearing-plate and to one of said struts, substantially as described.

In testimony whereof we have signed this specification in the presence of two subscribing witnesses.

NOAH JOHNSON.
HENRY L. HUNT.

Witnesses:
SAIN NULTY,
JOHN A. STERLING.